(12) United States Patent
Hubschmitt et al.

(10) Patent No.: US 8,215,332 B1
(45) Date of Patent: Jul. 10, 2012

(54) ZONE INDICATOR AND VACUUM BREAKER COMBINATION

(76) Inventors: Christopher L. Hubschmitt, Jupiter, FL (US); Justin C. Miller, Jupiter, FL (US); Gunter A. Albert, Jupiter, FL (US)

( * ) Notice: Subject to any disclaimer, the term of this patent is extended or adjusted under 35 U.S.C. 154(b) by 498 days.

(21) Appl. No.: 12/503,932

(22) Filed: Jul. 16, 2009

(51) Int. Cl.
*A01G 25/16* (2006.01)
*F16K 24/00* (2006.01)

(52) U.S. Cl. ............... 137/119.03; 137/218; 137/624.14

(58) Field of Classification Search ............. 137/119.03, 137/217, 218, 119.08, 118.01, 118.06, 624.14
See application file for complete search history.

(56) References Cited

U.S. PATENT DOCUMENTS

| | | | | |
|---|---|---|---|---|
| 3,459,208 A | * | 8/1969 | Clyde | 137/119.03 |
| 3,635,237 A | * | 1/1972 | Kah, Jr. | 137/119.03 |
| 3,785,391 A | * | 1/1974 | Miller | 137/119.03 |
| 3,924,652 A | * | 12/1975 | Kah, Jr. | 137/119.03 |
| RE29,252 E | * | 6/1977 | Miller | 137/119.03 |
| 4,125,124 A | * | 11/1978 | Kah | 137/119.03 |
| 4,316,480 A | * | 2/1982 | Kah, Jr. | 137/119.03 |
| 4,492,247 A | * | 1/1985 | Lockwood | 137/119.03 |
| 5,082,015 A | * | 1/1992 | Baker | 137/119.03 |
| 5,261,449 A | * | 11/1993 | Smetters | 137/514 |
| 5,937,889 A | * | 8/1999 | Krieg | 137/218 |

* cited by examiner

*Primary Examiner* — Craig Schneider
(74) *Attorney, Agent, or Firm* — Glenn E. Gold; H. John Rizvi; Gold & Rizvi, P.A.

(57) ABSTRACT

The object of the present invention is to provide a zone indicator and vacuum breaker combination. The zone indicator assembly includes a body having a funnel shaped interior providing a seal seat. A seal is provided upon a vacuum breaker flange of a shaft assembly. A lower end of the shaft assembly engages with a valve operating stem assembly of a rotating valve selecting disc. A zone indicator cap is assembled to an upper end of the shaft assembly. The cap adjusts vertically upon a body and cap interface disposed upon an upper end of the body.

15 Claims, 6 Drawing Sheets

ZONE INDICATOR AND VACUUM BREAKER COMBINATION

FIELD OF THE INVENTION

The present disclosure generally relates to an apparatus improving a hydro-indexing valve. More particularly, the present disclosure relates to a manual valve-indexing assembly, which incorporates a vacuum breaker within a valve-indexing body.

BACKGROUND OF THE INVENTION

Hydro-indexing valve assemblies are known, but limited in that they release water through an orifice at the top of the assembly. Hydro-indexing valves are activated by sufficient water supply being turned on and off. Therefore, no electrically operated parts or respective wiring is required to operate the valve. All that is needed for a totally automatic system is a controller to turn on and off the water supply (pump or solenoid). The hydro-indexing valve operates under almost all water conditions. The valve assembly includes a shaft assembly connecting a rotating cap to flow control disc, with the inclusion of a rotational directing cam. The differential in water pressure between the two sides of the flow control disc causes the shaft assembly to engage with the rotational directing cam, which rotates the flow control disc. The rotated flow control disc changes the fluid flow path from one exiting port to a different exiting port. As the indexing process occurs, backflow of water flows through the orifice at the top of the assembly. The current design releases water through an orifice at the top of the assembly.

Therefore, an indexing valve controller that eliminates any water discharge is highly desirable.

SUMMARY OF THE INVENTION

The present disclosure is generally directed to an enhanced hydro-indexing valve.

In some embodiments, the enhanced hydro-indexing valve assembly may include:
  a zone indexing valve assembly; and
  a zone indicator and vacuum breaker assembly, the zone indicator and vacuum breaker assembly comprising:
    a zone indicator body having a body seal seat being forming on a body interior wall upon a plane that is perpendicular to a longitudinal axis of the body and a zone control shaft aperture through a top surface of the body,
    a zone adjusting and vacuum breaker shaft assembly having a vacuum breaker flange, which includes a flange seal seat,
    a flange seal provided upon the flange seal seat, and
    a zone indicator cap secured to an upper end of the zone adjusting and vacuum breaker shaft assembly.

In another aspect, a zone indicator can be disposed upon a top surface of the zone indicator cap.

In still another aspect, the zone adjusting and vacuum breaker shaft assembly can include a zone adjusting upper shaft section, a zone adjusting lower shaft section, and the vacuum breaker flange provided therebetween.

While in another aspect, at least one end of the zone adjusting shaft has a non-circular shape.

In yet another aspect, the zone adjusting and vacuum breaker shaft assembly is vertically adjustably and rotationally assembled to the zone indicator and vacuum breaker assembly.

In another aspect, the zone indicator body includes a mounting flange extending outwardly from a mounting edge of the body.

While in another aspect, the zone indicator body is shaped having an interior diameter that reduces in dimension as it extends away from the mounting flange.

BRIEF DESCRIPTION OF THE DRAWINGS

The invention will now be described, by way of example, with reference to the accompanying drawings, where like numerals denote like elements and in which.

DETAILED DESCRIPTION OF THE INVENTION

Figure 1:
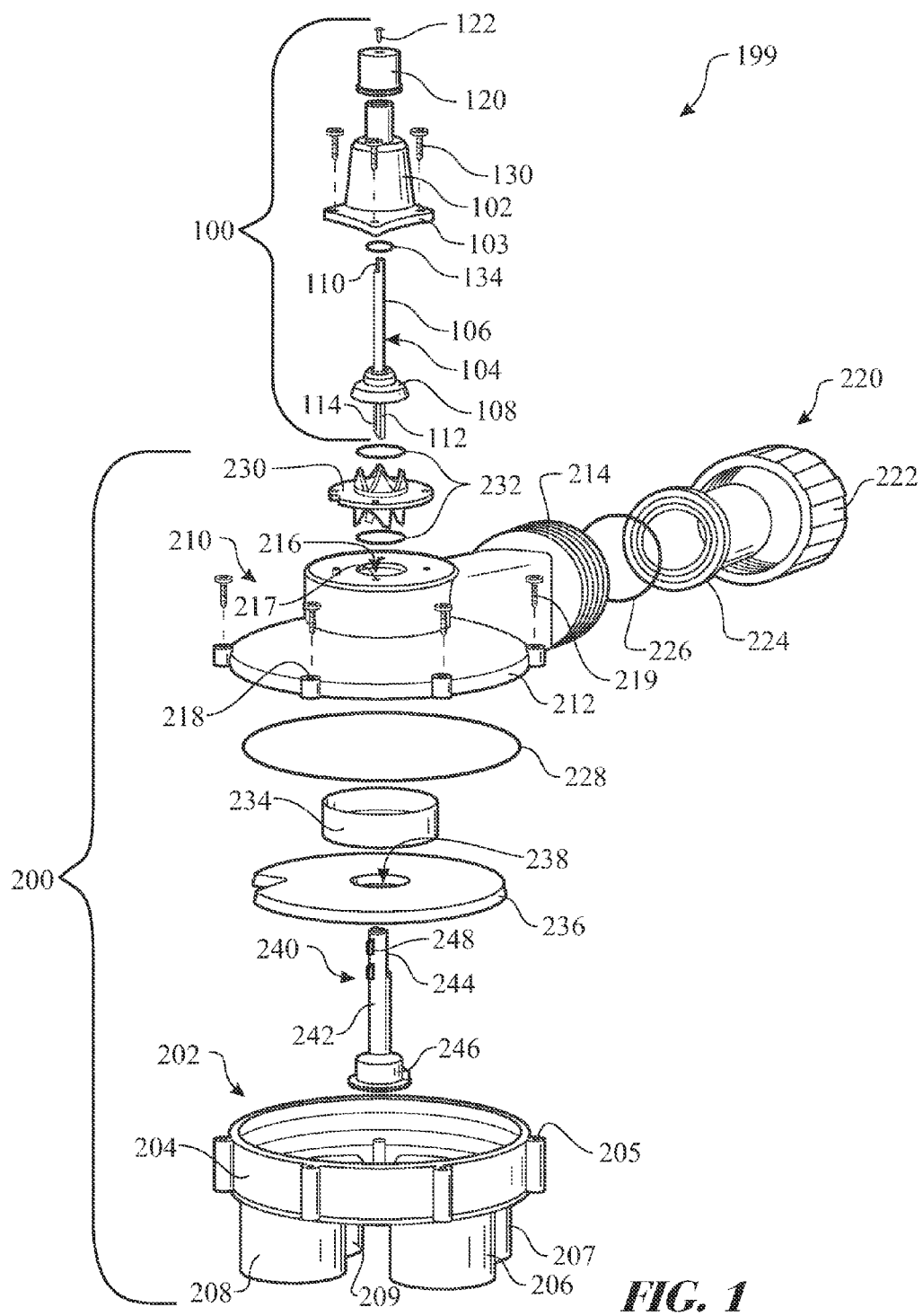
FIG. 1 presents an exploded isometric assembly view of an exemplary embodiment of a zone indicator and vacuum breaker assembly and a zone indexing valve assembly.
Figure 2:
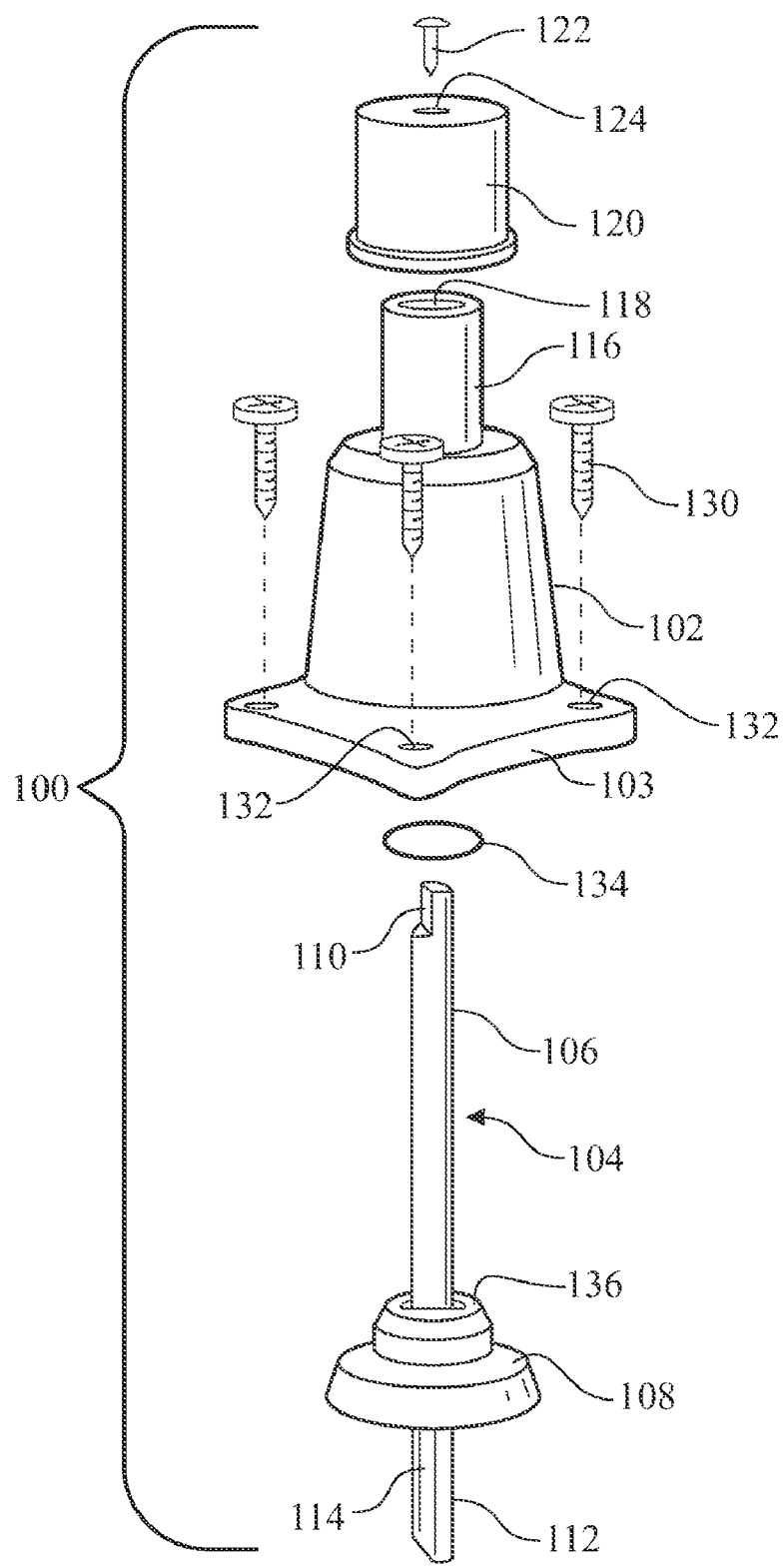
FIG. 2 presents an exploded isometric assembly view of an exemplary embodiment of a zone indicator and vacuum breaker assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
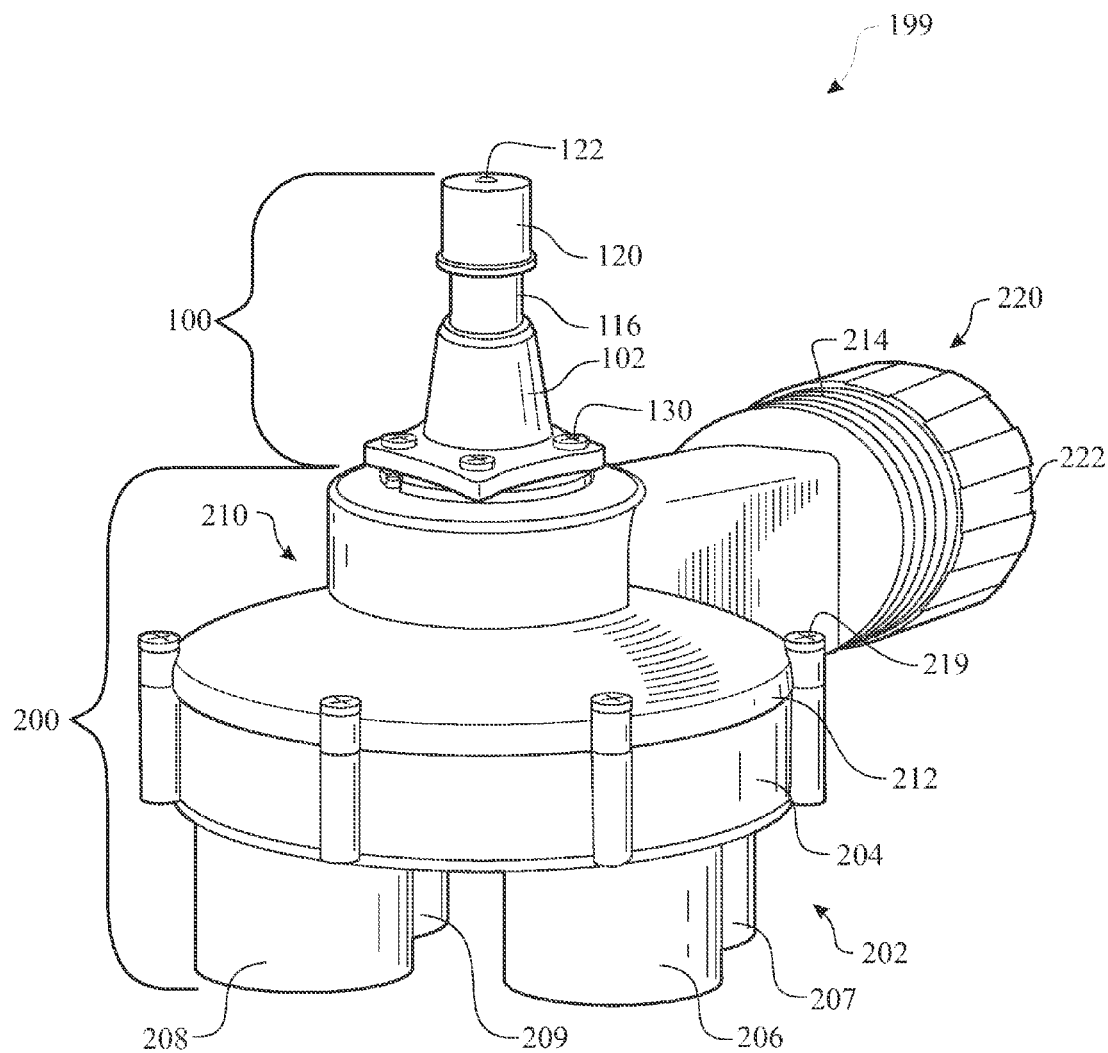
FIG. 3 presents an isometric view of a hydro-indexing valve assembly incorporating the zone indicator and vacuum breaker assembly.

An exemplary embodiment of the present invention is referred to as a zone indicator and vacuum breaker assembly 100 and is illustrated in FIGS. 1 through 6. The zone indicator and vacuum breaker assembly 100 includes a zone indicator body 102 having an inverted funnel interior shape, a housing mounting flange 103 disposed upon a mounting end of the body 102, and a housing and cap interface 116 disposed upon a cap end of the body 102. The housing mounting flange 103 comprises a series of fastener ports 132 in a mating configuration for securing the zone indicator and vacuum breaker assembly 100 to a zone indexing valve assembly 200 via a respective quantity of zone indicator assembly fasteners 130, as illustrated in FIG. 3. Similarly, a series of zone indicator mounting receptacles 217 are provided within a mating section of the zone indexing valve top 210 in a pattern matching the series of fastener ports 132. The housing and cap interface 116 is formed in a cylindrical shape having a zone indicator shaft aperture 118 formed therethrough. The zone indicator and vacuum breaker assembly 100 further comprises a zone indicator and vacuum breaker shaft assembly 104 for operably engaging with a valve operating stem assembly 240. The zone indicator and vacuum breaker shaft assembly 104 is preferably formed as a single molded component, having a zone indictor upper shaft section 106 disposed at a first end, a zone indicator lower shaft section 112 disposed at an opposite end, and a vacuum breaker flange 108 provided therebetween. The vacuum breaker flange 108 is formed having a circular shape with a tapered edge with the larger edge being oriented proximate the zone indicator lower shaft section 112 and the smaller edge being oriented proximate the zone indictor upper shaft section 106. A flange seal seat 136 is provided on the zone indictor upper shaft section 106 side of the zone indicator and vacuum breaker shaft assembly 104. A vacuum breaker seal 134 is seated upon the flange seal seat 136. A shaft lower non-circular feature 114 is included in the mating end of the zone indicator lower shaft section 112 ensuring engagement of the two-coupled members during rotation. Similarly, a shaft upper non-circular feature 110 is included in the mating end of the zone indictor upper shaft section 106 ensuring engagement of the zone indicator and vacuum breaker shaft assembly 104 and a zone indicator cap 120. The zone indicator and vacuum breaker shaft assembly 104 is inserted through the zone indicator shaft aperture 118. A cap fastener 122 is provided to secure the zone indicator cap 120 to the zone indicator and vacuum breaker shaft assembly 104 in an axial direction and completing the assembly. The cap fastener 122 is inserted through a cap fastener aperture 124 provided through the top of the zone indicator cap 120 and fastens to the upper end of the zone indictor upper shaft section 106. The zone indicator cap 120 can include a design which mates with the shaft upper non-circular feature 110 of the zone indicator and vacuum breaker shaft assembly 104, ensuring proper alignment.

The zone indicator and vacuum breaker assembly 100 is attached to a zone indexing valve assembly 200, collectively referred to as a complete zone control assembly 199. The zone indexing valve assembly 200 includes a zone indexing valve housing 202, a zone indexing valve top 210, and an inlet flow coupler assembly 220. The zone indexing valve housing 202 is formed having a valve bottom 204 which houses a rotating valve selecting disc 236 and the respective operational components, and a series of outlet flow conduits, such as a first outlet flow conduit 206, a second outlet flow conduit 207, a third outlet flow conduit 208, and a nth outlet flow conduit 209. The zone indexing valve top 210 is formed having a valve top body 212 for sealing the valve bottom 204, a zone control aperture 216 through a central top location, and a inlet flow connector 214. A series of fastener flange 218 are disposed in a spatial arrangement about a perimeter of the valve top body 212 and in registration with a series of fastener receptacle 205 are disposed in a spatial arrangement about a perimeter of the valve bottom 204 for securing the zone indexing valve top 210 and the zone indexing valve housing 202. A plurality of valve top fasteners 219 are inserted through the fastener flange 218 and threaded into the fastener receptacle 205. A valve top seal 228 is assembled between the zone indexing valve housing 202 and the zone indexing valve top 210, providing a fluid tight seal.

The inlet flow coupler assembly 220 provides a coupling interface between a fluid source and the inlet flow connector 214. The inlet flow coupler assembly 220 includes an inlet seal flange 224, which is inserted into a cavity of the inlet flow connector 214. An inlet flow coupler seal 226 provides a seal between the inlet seal flange 224 and a wall within the cavity. An inlet flow piping coupler 222 provides a mating connection, securing the inlet flow coupler assembly 220 to the zone indexing valve top 210. An inlet conduit (now shown) would be connected to the inlet flow piping coupler 222.

A valve disc assembly includes a rotating valve selecting disc 236 having a zone control aperture 238 provided through a center thereof. A flow cup 234 is provided upon an upper surface of the rotating valve selecting disc 236, centered about the zone control aperture 238. The rotating valve selecting disc 236 includes a passage (shown as a notch) for selectively providing a flow passage between the inlet port of the inlet flow connector 214 to the discharge conduit 206, 207, 208, 209. A valve operating stem assembly 240 provides a link between the rotating valve selecting disc 236, the zone control cam 230, and the zone indicator and vacuum breaker shaft assembly 104. The valve operating stem assembly 240 is formed having a operating stem 242 with a valve flange engaging interface 246 disposed at a lower end and a stem non-circular feature 244 formed at an upper end. The operating stem 242 provides a mechanical linkage between the zone indicator and vacuum breaker shaft assembly 104 and the rotating valve selecting disc 236, whereby the stem non-circular feature 244 engages with the shaft lower non-circular feature 114 of the zone indicator and vacuum breaker shaft assembly 104 and the valve flange engaging interface 246 is seated within the zone control aperture 238 of the rotating valve selecting disc 236. A cam follower 248 projects from the operating stem 242. The cam follower 248 engages with the zone control cam 230, causing the rotating valve selecting disc 236 to rotate and change the selected discharge conduit 206, 207, 208, 209. As water pressure to the inlet port is reduced, the backflow causes a vacuum, which lifts the rotating valve selecting disc 236 and the valve operating stem assembly 240. This motion engages the cam follower 248 with the zone control cam 230 causing the rotation.

A cam seal 232 is assembled on each side of the zone control cam 230. The seals provide a watertight interface between the zone indexing valve top 210, the zone control cam 230, and the zone indicator body 102 of the zone indicator and vacuum breaker assembly 100.

Figure 4:
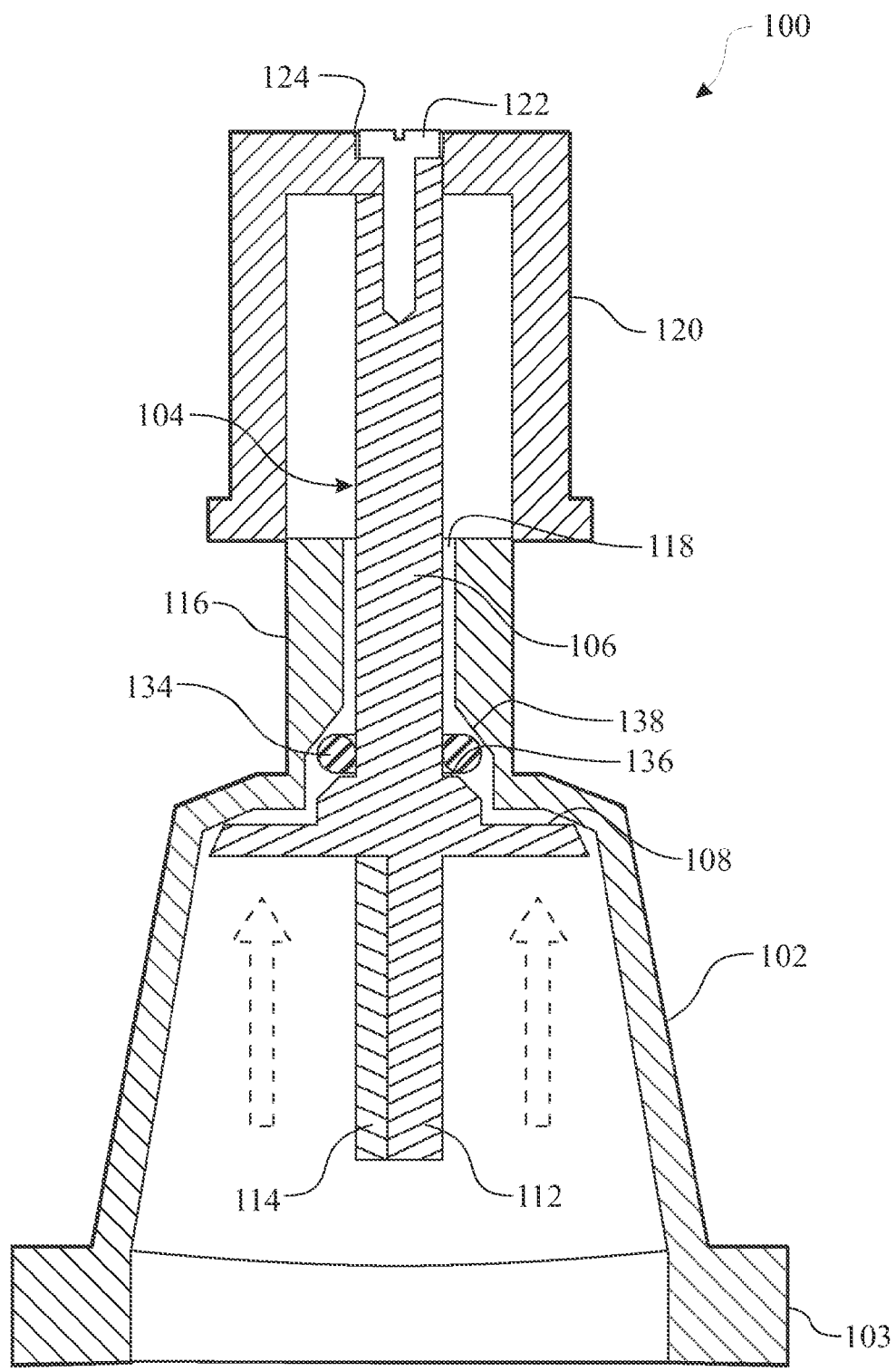
FIG. 4 presents a sectional side elevation view of the zone indicator and vacuum breaker assembly taken along a vertical centerline of the assembly, shown in a fluid flowing configuration.
Figure 5:
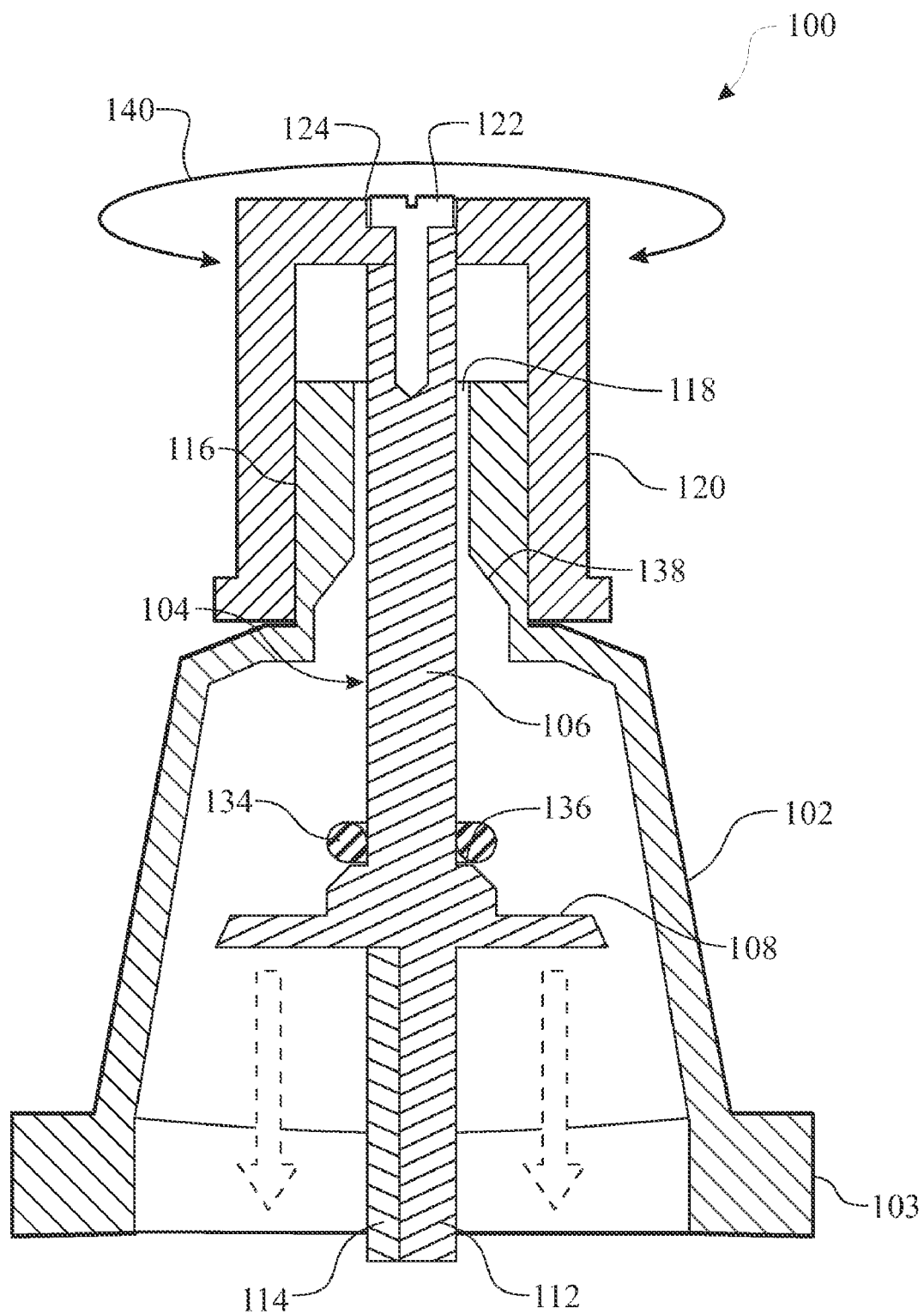
FIG. 5 presents a sectional side elevation view of the zone indicator and vacuum breaker assembly taken along a vertical centerline of the assembly, shown in a non-flowing configuration.
Figure 6:
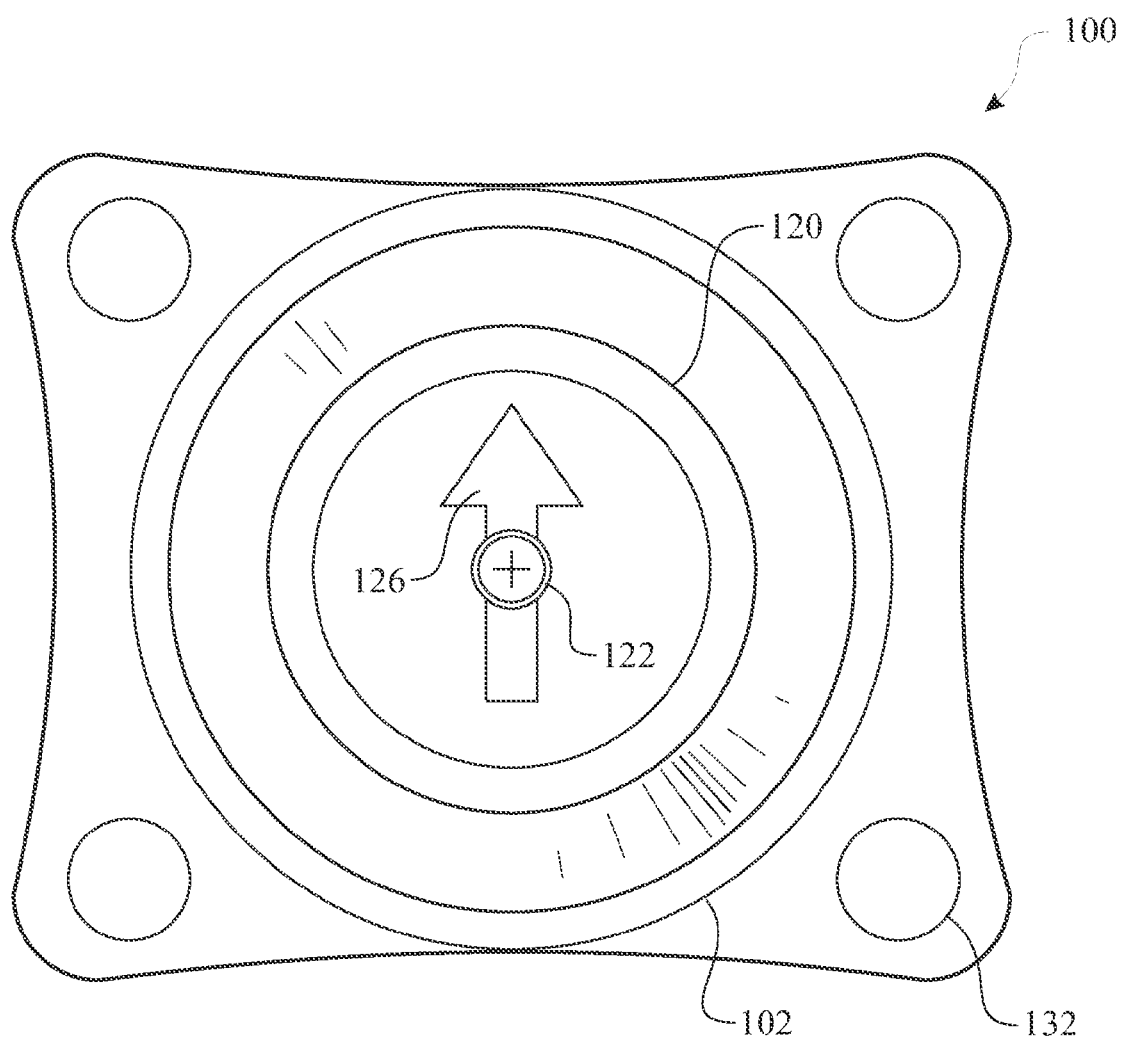
FIG. 6 presents a planar top view of the zone indicator and vacuum breaker assembly.

The operation of the zone indicator and vacuum breaker assembly 100 is presented in FIGS. 4 and 5. When fluid is flowing through the device, the pressure (shown by the upward arrows) pushes the vacuum breaker flange 108 upwards (FIG. 4), placing the vacuum breaker seal 134 into a sealing position between the flange seal seat 136 and the housing seal seat 138. When the flow is removed, the fluid pressure is reduced, the vacuum breaker flange 108 moves in a downward direction (FIG. 5), releasing any vacuum within the complete zone control assembly 199. As the fluid pressure cycles, the rotating valve selecting disc 236 rotates changing the selected zones. A zone indicator indicia 126 is provided on the cap, preferably being incorporated upon the top surface. The zone indicator cap 120 rotates in relation with the rotating valve selecting disc 236 as shown via a rotational motion 140. The zone indicator indicium 126 indicates which discharge conduit 206, 207, 208, 209 is currently configured.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A zone indicator and vacuum breaker combination assembly, comprising:
    a zone indicator body having a body seal seat being formed within an interior wall of the body upon a plane that is perpendicular to a longitudinal axis of the body, and a zone control shaft aperture through a top surface of the body;
    a zone adjusting and vacuum breaker shaft assembly having a vacuum breaker flange, which includes a flange seal seat;
    a flange seal provided upon the flange seal seat;
    a zone indicator cap secured to an upper end of the zone adjusting and vacuum breaker shaft assembly; and
    a zone indicator indicia provided upon the zone indicator cap, wherein the zone indicator indicates which zone is currently configured for fluid flow through.

2. A zone indicator and vacuum breaker combination assembly as recited in claim 1, the zone indicator body further comprising a cylindrically shaped body and cap interface extending upwards from a top portion of the zone indicator body.

3. A zone indicator and vacuum breaker combination assembly as recited in claim 1, the zone indicator body further comprising a mounting interface for assembling the body to a zone indexing valve assembly.

4. A zone indicator and vacuum breaker combination assembly as recited in claim 3, wherein the mounting interface is a mounting flange.

5. A zone indicator and vacuum breaker combination assembly as recited in claim 4, wherein the mounting flange comprises a plurality of fastener ports, the plurality of fastener ports being configured to mate with a plurality of zone indicator mounting receptacles of the zone indexing valve assembly.

6. An enhanced hydro-indexing valve assembly comprising:
    a zone indexing valve assembly comprising:
        a zone indexing valve housing having an inlet port and a plurality of discharge ports,
        a rotating valve selecting disc used for providing a flow path between the inlet port and a selected discharge port,
        a cam, and
        a valve operating stem assembly assembled to the rotating valve selecting disc and in operable communication with the cam; and
    a zone indicator and vacuum breaker assembly, the zone indicator and vacuum breaker assembly comprising:
        a zone indicator body having a body seal seat being forming on a body interior wall upon a plane, which is perpendicular to a longitudinal axis of the body and a zone control shaft aperture through a top surface of the body,
        a zone adjusting and vacuum breaker shaft assembly having a vacuum breaker flange, which includes a flange seal seat,
        a flange seal provided upon the flange seal seat, and
        a zone indicator cap secured to an upper end of the zone adjusting and vacuum breaker shaft assembly;
        wherein the zone indicator and vacuum breaker assembly is assembled to the zone indexing valve housing and engaging with the valve operating stem assembly.

7. A zone indicator and vacuum breaker combination assembly as recited in claim 6, the zone indicator body further comprising a cylindrically shaped body and cap interface extending upwards from a top portion of the zone indicator body.

8. A zone indicator and vacuum breaker combination assembly as recited in claim 6, the zone indicator body further comprising a mounting interface for assembling the body to a zone indexing valve assembly.

9. A zone indicator and vacuum breaker combination assembly as recited in claim 8, wherein the mounting interface is a mounting flange.

10. A zone indicator and vacuum breaker combination assembly as recited in claim 9, wherein the mounting flange comprises a plurality of fastener ports, the plurality of fastener ports being configured to mate with a plurality of zone indicator mounting receptacles of the zone indexing valve assembly.

11. A zone indicator and vacuum breaker combination assembly as recited in claim 6, the zone indicator cap further comprising a zone indicator indicia to indicate which zone is currently configured for fluid flow through.

12. A zone indicator and vacuum breaker combination assembly, comprising:
    a zone indicator body having a body seal seat being formed within an interior wall of the body upon a plane, which is perpendicular to a longitudinal axis of the body, and a zone control shaft aperture through a top surface of the body;
    a mounting interface for assembling the body to a zone indexing valve assembly;
    a zone adjusting and vacuum breaker shaft assembly having a vacuum breaker flange, which includes a flange seal seat;
    a flange seal provided upon the flange seal seat;
    a zone indicator cap secured to an upper end of the zone adjusting and vacuum breaker shaft assembly; and
    a zone indicator indicia disposed upon the zone indicator cap to indicate which zone is currently configured for fluid flow through.

13. A zone indicator and vacuum breaker combination assembly as recited in claim 12, the zone indicator body further comprising a cylindrically shaped body and cap interface extending upwards from a top portion of the zone indicator body.

14. A zone indicator and vacuum breaker combination assembly as recited in claim 12, wherein the mounting interface is a mounting flange.

15. A zone indicator and vacuum breaker combination assembly as recited in claim 14, wherein the mounting flange comprises a plurality of fastener ports, the plurality of fastener ports being configured to mate with a plurality of zone indicator mounting receptacles of the zone indexing valve assembly.

* * * * *